United States Patent
Wang

(10) Patent No.: US 7,667,930 B1
(45) Date of Patent: Feb. 23, 2010

(54) DISK DRIVE SUSPENSION AND FLEXURE WITH DOUBLY AND DIFFERENTIALLY DEFLECTED FRAME

(75) Inventor: Charles Wang, Temecula, CA (US)

(73) Assignee: Magnecomp Corporation, Murrieta, CA (US)

( * ) Notice: Subject to any disclaimer, the term of this patent is extended or adjusted under 35 U.S.C. 154(b) by 702 days.

(21) Appl. No.: 11/271,389

(22) Filed: Nov. 10, 2005

Related U.S. Application Data

(60) Provisional application No. 60/695,963, filed on Jul. 1, 2005.

(51) Int. Cl.
*G11B 5/147* (2006.01)

(52) U.S. Cl. .................................................. 360/245.3

(58) Field of Classification Search .............. 360/245.3, 360/245.4, 245.7, 244.2, 294.4, 245, 234.5; 720/672
See application file for complete search history.

(56) References Cited

U.S. PATENT DOCUMENTS

| | | | |
|---|---|---|---|
| 5,291,359 A | 3/1994 | Wolter | |
| 5,636,089 A | 6/1997 | Jurgenson et al. | |
| 5,661,619 A | 8/1997 | Goss | |
| 5,666,241 A | 9/1997 | Summers | |
| 5,790,347 A | 8/1998 | Girard | |
| 5,852,532 A | 12/1998 | Summers | |
| 6,181,522 B1 * | 1/2001 | Carlson | 360/245.1 |
| 6,359,758 B1 * | 3/2002 | Boutaghou | 360/294.4 |
| 6,392,843 B1 * | 5/2002 | Murphy | 360/245.3 |
| 6,741,425 B1 | 5/2004 | Wu et al. | |
| 7,027,266 B2 * | 4/2006 | Takahashi et al. | 360/244.8 |
| 2002/0154448 A1 * | 10/2002 | Kasajima et al. | 360/245.3 |

* cited by examiner

*Primary Examiner*—Allen T Cao
(74) *Attorney, Agent, or Firm*—Intellectual Property Law Offices of Joel Voelzke, APC

(57) ABSTRACT

A disk drive suspension has a doubly increased dimple contact force through separate, differential deflections of the flexure frame toward the load beam so as to carry the flexure tongue having dimple engagement with the load beam closer to the beam, and thus have greater dimple contact force without adverse PSA alteration. Doubly deflecting the outrigger struts of the flexure toward the supporting load beam in differential relation with a greater deflection and local strut displacement in a first location and a lesser deflection and local strut displacement in a second location on the initially deflected portion of the frame outriggers provides increased dimple contact force.

32 Claims, 4 Drawing Sheets

DISK DRIVE SUSPENSION AND FLEXURE WITH DOUBLY AND DIFFERENTIALLY DEFLECTED FRAME

CROSS-REFERENCE TO RELATED APPLICATIONS

This application claims the benefit of U.S. Provisional Application Ser. No. 60/695,963, filed Jul. 1, 2005.

BACKGROUND OF THE INVENTION

1. Field of the Invention

This invention relates to disk drive suspensions, and, more particularly, to suspensions having doubly increased dimple contact force through separate, differential deflections of the flexure frame toward the load beam so as to carry the flexure tongue having dimple engagement with the load beam closer to the beam, and thus have greater dimple contact force. The invention further relates to suspension flexures, and to suspension manufacturing and operating methods.

More specifically, in a preferred embodiment, the invention provides increased dimple contact force from a generally conventional suspension and flexure arrangement by doubly deflecting the outrigger struts of the flexure toward the supporting load beam in differential relation to have a greater deflection and local strut displacement in a first location and a lesser deflection and local strut displacement in a second location on the initially deflected portion of the frame outriggers.

2. Description of the Related Art

Disk drive suspensions comprise in general an assembly of a mount plate, a load beam attached to an actuator and having and a beam portion that can include or comprise a stiffener, and a flexure that can be added to or formed with the beam portion. The flexure typically has a frame including outrigger struts and cantilevered tongue to carry a slider in gimballing relation about a dimple locus defined by a dimple on the tongue or the load beam and an opposing cooperating surface conversely on the load beam or tongue under a force referred to as the dimple contact force (sometimes DCF). The suspension assembly is in operative association with a disk.

BRIEF SUMMARY OF THE INVENTION

Maintaining an appropriate dimple contact force between the flexure tongue and the beam portion is critical to an effective disk drive suspension and its achievement must be compatible with other critical properties of the suspension. PSA, or pitch static attitude, is an important characteristic of a suspension. Dimple height (which is physically limited), dimple contact force, flexure moment of inertia and PSA are interrelated. In a given flexure geometry, assuming the moment of inertia is held constant, dimple height and dimple contact force are directly related. Increasing dimple contact force is then the same as raising the height of the dimple in terms of an increase or decrease in PSA. The invention use of a second deflection at the described angles in effect pre-biases the PSA in the correct direction and amount and the DCF can then be increased by raising the tongue toward the load beam without adversely affecting the intended PSA, or increasing dimple height.

It is an object of the invention, therefore, to provide novel and improved methods of manufacturing disk drive suspensions and the flexures thereof. It is a further object to provide an improved disk drive suspension in which dimple contact force is step-wise increased by successive deflections of the flexure frame. A further object is the provision of an improved flexure. A still further object is to provide methods and products in which staged deflections of the frame outrigger struts provide longitudinally spaced shoulders that carry the tongue supported by the frame into closer proximity to the load beam, and thus increase dimple contact force and improve performance of the suspension, e.g. increasing the dimple contact force by e.g. two times by modifying the suspension flexure according to the invention.

These and other objects of the invention to become apparent hereinafter are realized in a disk drive suspension flexure comprising a frame carrying a flexure tongue in cantilevered relation for dimple contact with a load beam, and a double deflection in the frame at longitudinally spaced locations to twice increase the dimple contact force between the tongue and the load beam.

In this and like embodiments, typically, the frame is differentially doubly deflected in relatively larger and relatively smaller deflections, the flexure tongue has a pitch angle that varies with variations in the extent of the smaller of the frame deflections, the flexure extends in a flexure plane and has a first frame portion, the first frame portion having a second frame portion, and the double deflection includes a first deflection at a first location in the frame first portion, the deflection being to a first angle to the flexure plane, and a second deflection at a second location in the second frame portion, the deflection being to a second, greater angle to the flexure plane, whereby the tongue is shifted toward the load beam in dimple contact force twice increasing relation, the second deflection is less than the first deflection, and/or the flexure tongue has a pitch angle at least partially determined by the second deflection.

In a further embodiment, the invention provides a disk drive suspension comprising a load beam and the foregoing flexure.

In a further embodiment, the invention provides a disk drive suspension comprising a load beam and a flexure assembly, the flexure comprising a base, a cross member, a pair of spaced, opposed outrigger struts extending from the base and supporting the cross member and a tongue cantilevered from the cross member and in dimple contact with the load beam, each outrigger strut having a first portion having at a first locus a first deflection arranged to increase the force of the dimple contact, each outrigger strut having at a second locus a second deflection arranged to further increase the dimple contact force.

In this and like embodiments, typically, each outrigger strut is twice deflected in the same direction at longitudinally spaced locations to define the first and second deflections, the tongue has a terminus, and there is also included each outrigger strut having the first locus in a transverse plane located between the base and the tongue terminus, each outrigger strut having the second locus in a transverse plane extending through the tongue; thus the first locus-including transverse plane can be a first transverse plane, the first locus transverse plane being a first transverse plane and each strut having the first locus in that first transverse plane, and the second locus in the second transverse plane extending through the tongue.

Further, in a typical embodiment, the flexure extends in a flexure plane, and each outrigger strut has a first portion first deflected to lie in a first portion plane at a first angle to the flexure plane, and a second portion separately deflected to lie in a second portion plane at a second, greater angle to the flexure plane. In this embodiment, typically, the second portion plane lies at an angle to the first portion plane that is less than the angle of the first portion plane to the flexure plane, and the first portion plane lies at an angle to the flexure plane that is at least three times greater than the angle of the first portion plane to the flexure plane.

In a further embodiment, the invention provides a disk drive suspension comprising an assembly of a load beam extended in a load beam plane and a flexure extended in a flexure plane, the flexure comprising a frame having a base fixed to the load beam, a transverse cross member longitudinally spaced from the base, a pair of laterally spaced and opposed longitudinally extended outrigger struts extending from the base and supporting the cross member and a tongue cantilevered from the cross member toward the base, the tongue having a free terminus the tongue and load beam having dimple contact in a dimple locus defined by the tongue and load beam, the frame having a first transverse plane normal to the flexure plane and between the tongue terminus and the base, the frame having a second transverse plane normal to the flexure plane and longitudinally spaced from the first transverse plane, the second transverse plane intersecting the tongue, each outrigger strut having a first portion having at a first locus within the first transverse plane a first relatively larger angle shoulder defined by a first strut deflection toward the load beam and arranged to increase the force of the dimple contact, each outrigger strut having a second portion continuation of the first portion, the second portion having at a second locus within the second transverse plane a second relatively smaller angle shoulder defined by a second strut deflection of the already deflected strut first portion toward the load beam and arranged to further increase the force of the dimple contact.

In this and like embodiments, the first shoulder disposes the strut first portion at an angle of about 1 to 30 degrees to the flexure plane, preferably about 2 to 10 degrees, e.g. 9 degrees, and/or the second shoulder deflection disposes the strut second portion at an angle between 1 and 30 degrees, and preferably 2 to 15 degrees to the strut first portion, e.g. 2 degrees, or about 1 to about 30 degrees to the flexure plane.

An invention method embodiment includes the method of manufacturing a disk drive suspension comprising an assembly of a load beam and a flexure, the flexure comprising a base, a cross member, a pair of spaced, opposed outrigger struts extending from the base and supporting the cross member and a tongue cantilevered from the cross member and in dimple contact with the load beam, the method including deflecting a first portion of each outrigger strut at a first locus to increase the force of dimple contact, and deflecting a second portion of each outrigger strut comprising the deflected first portion at a second locus to further increase the dimple contact force.

In this and like embodiments, typically, the method further includes locating the first locus relatively farther from the cross member than the second locus, the tongue having a terminus, and including also locating the first locus in a transverse plane located between the base and the tongue terminus, locating the second locus in a transverse plane extending through the tongue, having the transverse plane be a first transverse plane, and including also locating the second locus in a second transverse plane extending through the tongue and parallel with the first transverse plane, extending the flexure in a flexure plane, deflecting each outrigger strut first portion to lie in a first portion plane at a first angle to the flexure plane, and deflecting the outrigger strut second portion to lie in a second portion plane at a second, greater angle to the flexure plane, maintaining the second portion plane at an angle to the first portion plane that is less than the angle of the first portion plane to the flexure plane, and maintaining the first portion plane at an angle to the flexure plane that is at least three times greater than the angle of the second plane to the first portion plane.

A further method embodiment includes the method of manufacturing a disk drive suspension flexure, including carrying a flexure tongue in cantilevered relation on a frame for dimple contact with a load beam, and doubly deflecting the frame at longitudinally spaced locations to twice increase the dimple contact force between the tongue and the load beam.

In this and like embodiments, typically, the method includes also deflecting the frame differentially in longitudinally successive deflections so that successive deflections are smaller, varying the flexure tongue pitch angle by varying the second of the double deflections, having the flexure extend in a plane, and including also deflecting at a first location a first portion of the frame to a first angle to the flexure plane, and deflecting at a second location a portion of the frame first portion to a second, greater angle to the flexure plane to twice shift the tongue toward the load beam to twice increase the dimple contact force, deflecting the frame differentially in successive deflections so that successive deflections are smaller, and varying the flexure tongue pitch angle by varying the second of the double deflections.

A further method according to the invention includes a method of operating a disk drive suspension flexure, including carrying a flexure tongue in cantilevered relation on a frame in dimple contact with a load beam, and maintaining a double deflection in the frame at longitudinally spaced locations in dimple contact force between the tongue and the load beam twice increasing relation.

In this and like embodiments, typically, the method includes maintaining a differential in deflection between the double deflections such that deflection relatively closer to the locus of dimple contact is smaller than deflection relatively farther from the locus.

BRIEF DESCRIPTION OF THE SEVERAL VIEWS OF THE DRAWINGS

The invention will be further described in conjunction with the attached drawings in which.

DETAILED DESCRIPTION OF THE INVENTION

Figure 1:
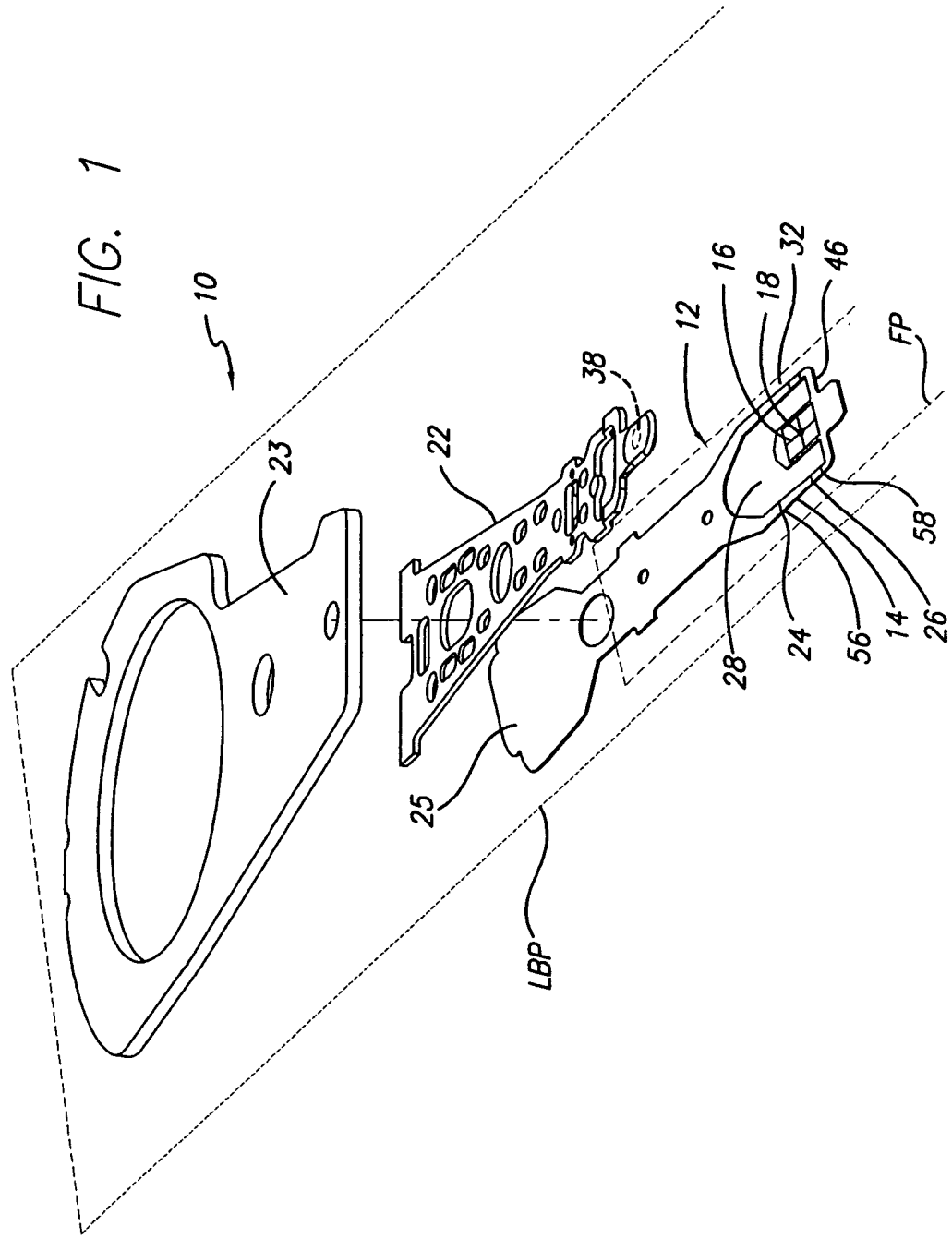
FIG. 1 is an exploded oblique view of the suspension according to the invention.
Figure 2:
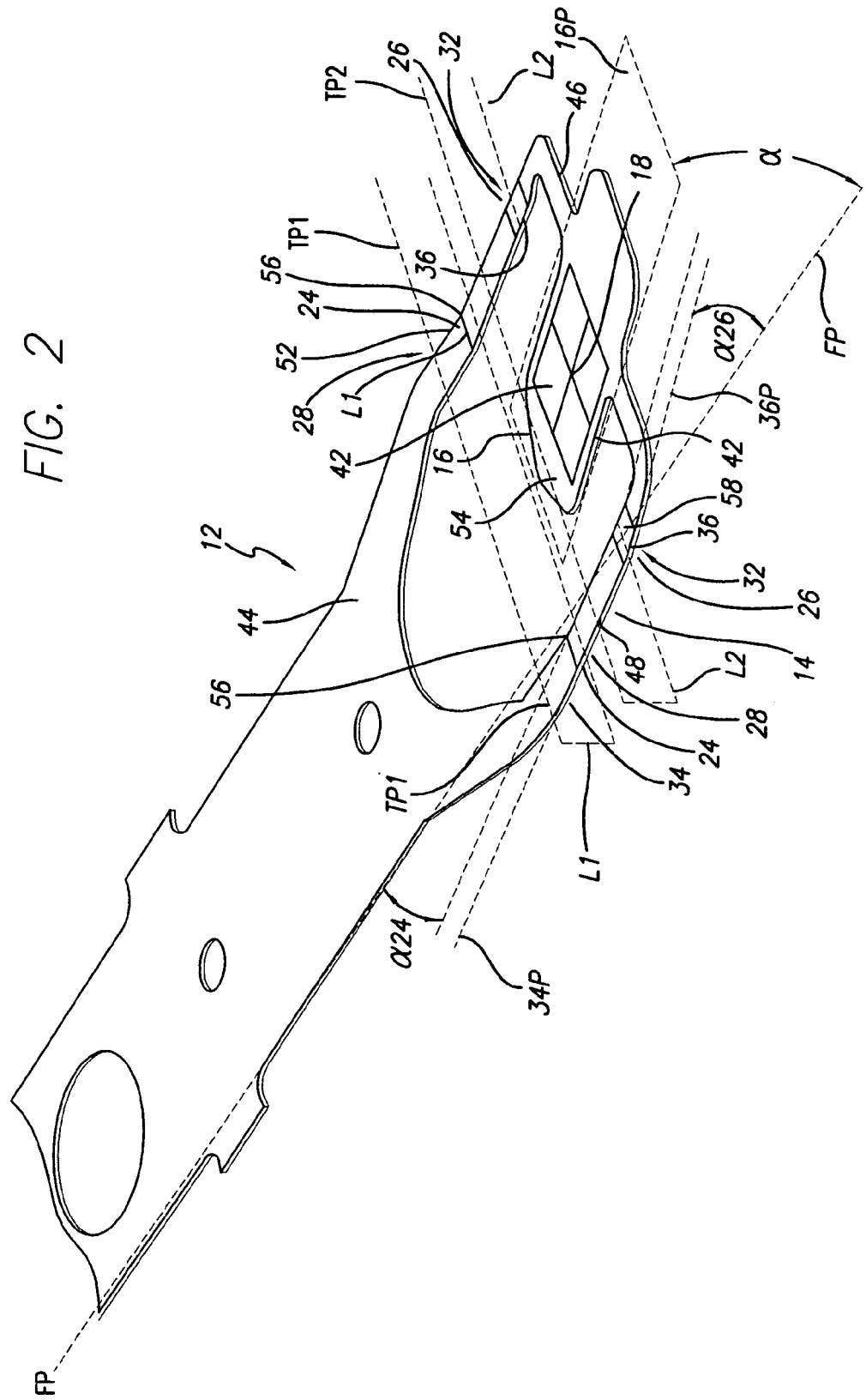
FIG. 2 is an oblique view of the suspension flexure.
Figure 3:
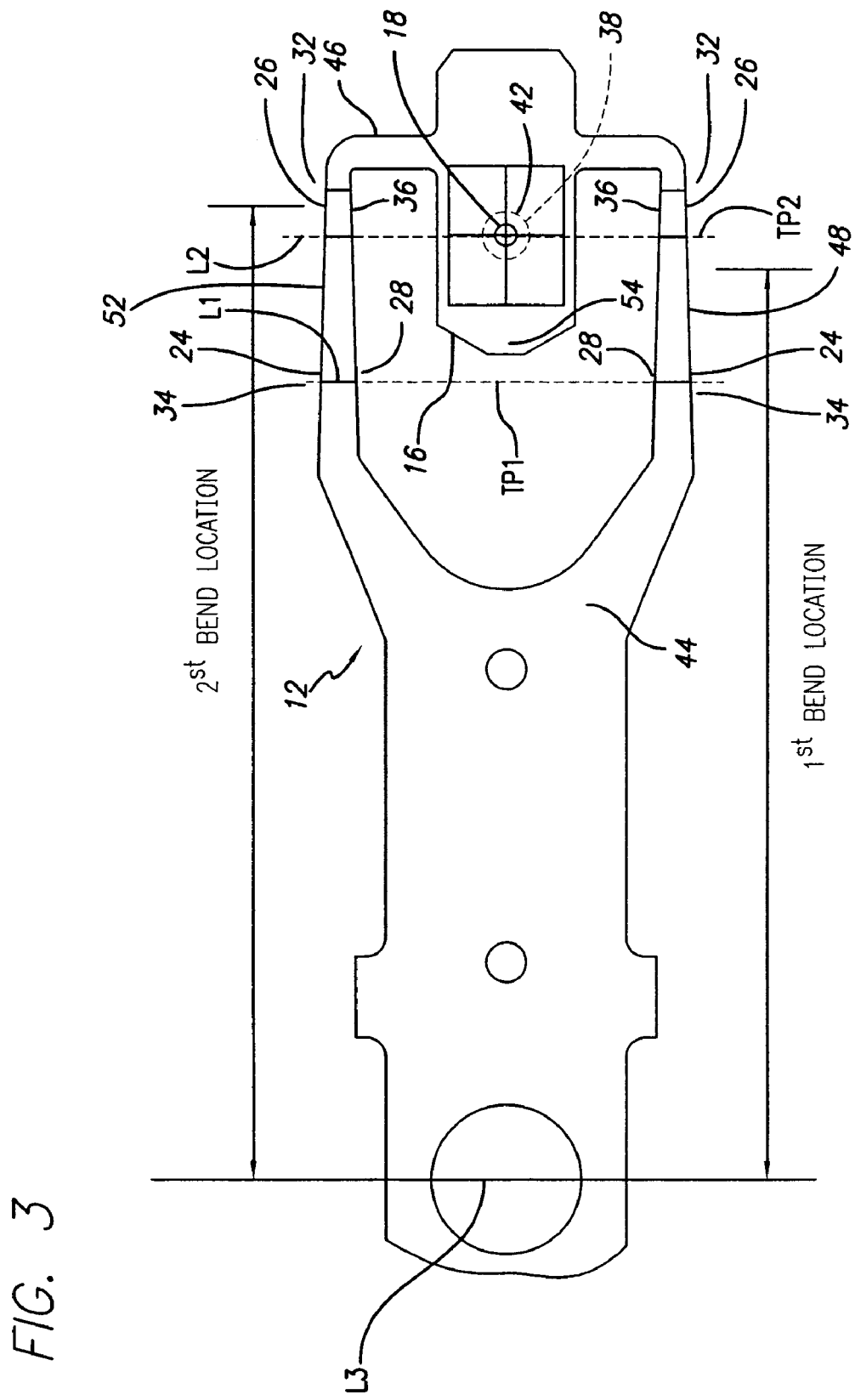
FIG. 3 is a plan view thereof.
Figure 4:
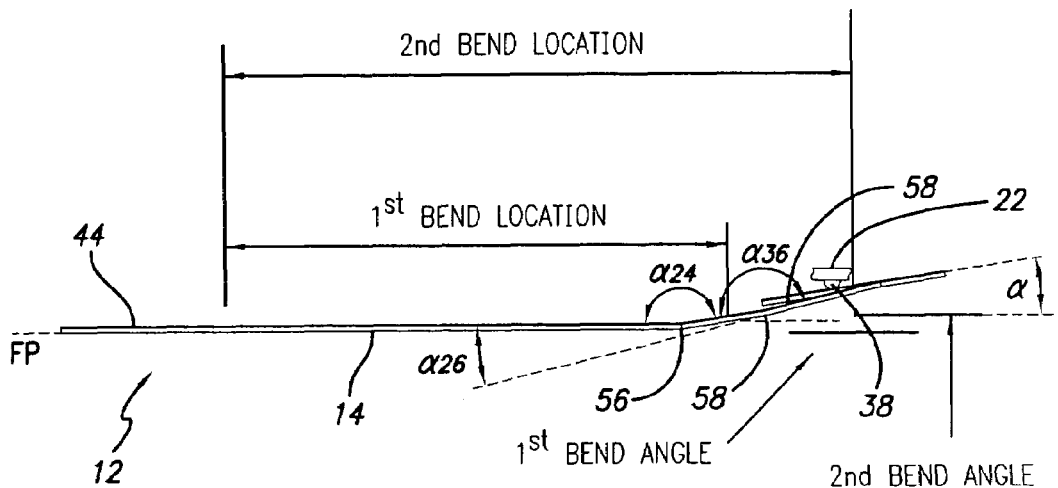
FIG. 4 is a schematic depiction view of the flexure deflections and associated tongue displacement created thereby; and, FIG. 5 is a side view, generally in elevation, of the deflected flexure
Figure 5:
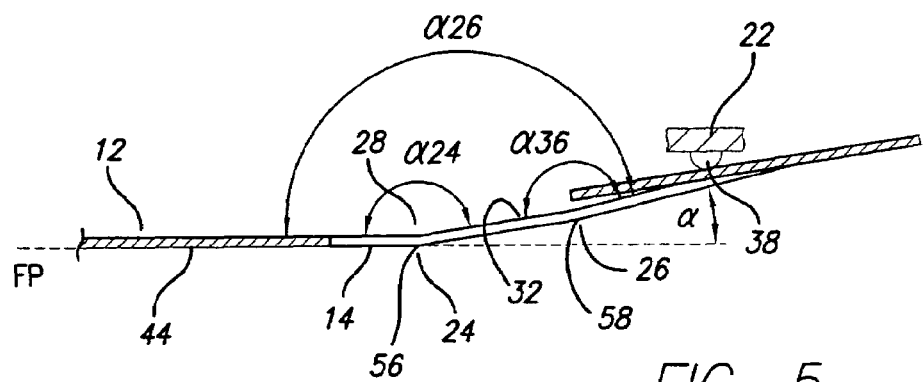

With reference now to the drawings in detail, in FIGS. 1-5 the invention disk drive suspension assembly 10 comprises a flexure 12 comprising a frame 14 carrying a flexure tongue 16 in cantilevered relation as shown for dimple contact in dimple locus 18 with a load beam 22 supported by mount plate 23 by attachment to flexure hinge portion 25. Frame 14 has a double deflection 24, 26 in the frame at longitudinally spaced locations 28, 32 to twice, stepwise and progressively, increase the dimple 38 contact force between the tongue 16 and the load beam 22.

Frame 14 is differentially doubly deflected at 24, 26 in relatively larger and relatively smaller deflections as shown. Flexure tongue 16 has a pitch angle α (FIG. 5) to the flexure plane FP that varies with variations in the angle of the larger and smaller deflections 24, 26. Flexure 12 extends in the flexure plane FP and has a first frame portion 34. First frame portion 34 itself has a second frame portion 36. Double deflections 24, 26 include a first deflection 24 at a first location 28 in the first frame portion 34. The first deflection 24 is to a first angle α24 to the flexure plane FP. The second deflection 26 is at a second location 32 in the second frame portion 36. Second deflection 26 is to a second, greater angle α26 to the flexure plane FP. First and second deflections 24, 26 shift or displace the tongue 16 toward the load beam 22 in dimple contact force increasing relation, e.g. twice increasing the DCF at dimple locus 18 comprising dimple 38 formed in the load beam 22 and opposing surface 42 of the tongue 16.

More particularly, the invention disk drive suspension assembly 10 comprises load beam 22 and the flexure 12 supported by the mount plate 23. Flexure 12 frame 14 defined by a base 44, a cross member 46, a pair of spaced, opposed outrigger struts 48, 52 extending from the base and supporting the cross member and tongue 16 cantilevered from the cross member and in dimple 38 contact with the load beam 22. Each outrigger strut 48, 52 has a first portion 34 having at a first locus L1 (FIG. 2) a first deflection 24 arranged to increase the force of the dimple contact, and at a second locus L2 a second deflection 26 arranged to further increase the dimple contact force in the dimple locus 18.

As shown, each outrigger strut 48, 52 is twice deflected in the same direction (both toward the load beam 22) at longitudinally spaced locations 28 (within locus L1) and 32 (within locus L2) to define the first and second deflections 24, 26. Locus L1 is in a transverse plane TP1 located between the base 44 and the tongue terminus 54. Second locus L2 is located in a second transverse plane TP2 located to extend through the tongue 16. Thus, first locus L1—including transverse plane TP1—is a first transverse plane and each strut 48, 52 has its first locus L1 in that first transverse plane, and its second locus L2 in second transverse plane TP2 that extends through the tongue.

As in previous embodiments, flexure 12 extends in a flexure plane FP. Each outrigger strut 48, 52 has a first portion 34 first deflected to lie in a first portion plane 34P at a first angle α24 (between about 1 and about 30 degrees) to the flexure plane FP, and a second portion 36 separately deflected to lie in a second portion plane 36P at a second, greater angle α26 (α26 is thus greater than α24 and up to about 30 degrees) to the flexure plane. The second portion plane 36P also lies at an angle α36 to the first portion plane 34P that is less than the angle α24 of the first portion plane 34P to the flexure plane FP. Generally, first portion plane 34P lies at an angle α24 to the flexure plane FP that is at least three times greater than the angle α36 of the second portion plane 36P to the first portion plane 34P, where α36 is between about 1 and about 30 degrees and typically about 2-10 degrees.

In a preferred embodiment, the invention disk drive suspension assembly 10 comprises load beam 22 extended in a load beam plane LBP and flexure 12 extended in flexure plane FP. Flexure 12 comprises frame 14 having a base 44 fixed to the load beam 22, a transverse cross member 46 longitudinally spaced from the base, a pair of laterally spaced and opposed longitudinally extended outrigger struts 48, 52 extending from the base and supporting the cross member and tongue 16 cantilevered from the cross member toward the base, the tongue having a free terminus 54. The tongue 16 and load beam 22 have dimple contact in a dimple locus 18 defined by the tongue and load beam; frame 14 has a first transverse plane TP1 disposed normal to the flexure plane FP and located between the tongue terminus 54 and the base 44. Frame 14 has a second transverse plane TP2 disposed normal to the flexure plane FP and longitudinally spaced from the first transverse plane TP1. Second transverse plane TP2 intersects the tongue 16. Each outrigger strut 48, 52 has a first portion 34 having at a first locus L1 within the first transverse plane TP1 a first relatively larger angle shoulder 56 defined by a first strut deflection 24 toward the load beam 22 and arranged to increase the force of the dimple contact. Each outrigger strut 48, 52 has a second portion 36 continuation of the first portion 34, the second portion having at a second locus L2 within the second transverse plane TP2 a second relatively smaller angle shoulder 58 defined by a second strut deflection 26 of the already deflected strut first portion 34 toward the load beam 22 and arranged to further increase the force of the dimple contact.

Typically, first shoulder 56 disposes the strut first portion 34 at an angle of about 1 to about 30 degrees to the flexure plane FP, and/or the second shoulder 58 deflection disposes the strut second portion 36 at an angle between 1 and 30 degrees to the plane FP and has an angle α36 about 2 to about 10 degrees to the strut first portion 34.

In its method aspects, the invention methods include manufacturing a disk drive suspension assembly 10 comprising a load beam 22 and a flexure 12 supporting the load beam on mount plate 23, the flexure comprising a base 44, a cross member 46, a pair of spaced, opposed outrigger struts 48, 52 extending from the base and supporting the cross member and a tongue 16 cantilevered from the cross member and in dimple contact with the load beam. The manufacturing method includes deflecting a first portion 34 of each outrigger strut 48, 52 at a first locus L1 to increase the force of the dimple contact, and deflecting a second portion 36 of each outrigger strut 48, 52 comprising the deflected first portion 34 at a second locus L2 to further increase said dimple contact force.

The noted manufacturing method further includes locating the first locus L1 relatively farther from the cross member 46 than the second locus L2, tongue 16 having a terminus 54, locating the first locus L1 in a transverse plane TP1 located between the base 44 and the tongue terminus, locating the second locus in a transverse plane TP2 extending through the tongue, having transverse plane TP1 be a first transverse plane, and including also locating the second locus L2 in second transverse plane TP2 extending through the tongue and parallel with the first transverse plane TP1, extending the flexure 12 in a flexure plane FP, deflecting each outrigger strut 48, 52 first portion 34 to lie in a first portion plane 34P at a first angle to the flexure plane FP, and deflecting the outrigger strut second portion 36 to lie in a second portion plane 36P at a second, greater angle α26 to the flexure plane FP, maintaining the second portion plane 36P at an angle α36 to the first portion plane 34P that is less than the angle α24 of the first portion plane 34P to the flexure plane FP, and maintaining the first portion plane 34P at an angle α24 to the flexure plane that is at least three times greater than the angle α36 of the second plane 36P to the first portion plane 34P.

A further invention manufacturing method embodiment includes manufacturing a disk drive suspension flexure 12, including carrying a flexure tongue 16 in cantilevered relation on a frame 14 for dimple contact with a load beam 22, and doubly deflecting the frame at longitudinally spaced locations 24, 26 to twice increase the dimple contact force between the tongue and the load beam. This method typically also includes deflecting the frame 14 differentially (i.e. not identically) in physically if not temporally successive deflections (i.e. deflections at 24 and 26 can be simultaneous or separate in time, but are always physically spaced) so that successive deflections are smaller, varying the flexure tongue pitch angle α of tongue plane 16P to flexure plane FP by varying the second deflection, i.e. deflection 26 of the double deflections 24, 26, having the flexure 12 extend in a plane FP, deflecting at a first location 28 a first portion 34 of the frame 14 to a first angle α24 to the flexure plane FP, and deflecting at a second location 32 a portion 36 of the frame first portion 34 to a second, greater angle α26 to the flexure plane FP to twice shift the tongue 16 toward the load beam 22 to twice increase the dimple contact force, deflecting the frame 12 differentially in successive deflections 24, 26 so that successive deflections are smaller, and varying the flexure tongue pitch angle α by varying the second deflection (deflection 26) of the double deflections 24, 26.

The invention further contemplates a method of operating a disk drive suspension flexure 12, including carrying a flexure tongue 16 in cantilevered relation on a frame 14 in dimple 38 contact with a load beam 22, and maintaining a double deflection 24, 26 in the frame at longitudinally spaced locations 28, 32 in dimple contact force twice increasing relation between the tongue and the load beam. Typically, the just described method includes maintaining a differential in deflection between the double deflections 24, 26 such that deflection 26 relatively closer to the locus 18 of dimple 38 contact is smaller than the deflection 24 relatively farther from the locus. With the foregoing methods, a new suspension product has doubled dimple contact force over a previous product version having a single deflection in the frame, from a DCF (dimple contact force) rating of 0.12 gf to one of 0.25 gf.

Table 1 shows the modeled DCF of the previous (Prior Art) product design. "Bend Location" refers to strut deflection.

TABLE 1

| | Modeled DCF Results | | | | |
| --- | --- | --- | --- | --- | --- |
| Description | Bend Location (in) | Angle (deg) | Offset Height | Model DCF (g) | Measured* DCF |
| Prior Art | — | — | — | 0.14 | 0.12 |

*Average of 15 samples.

Table 2 shows the 1$^{st}$ and 2$^{nd}$ bend or deflection angle and location on the outrigger struts to achieve a pitch angle of from 0.98 to 2.49 degrees while increasing the DCF 0.20 g over the Prior Art suspension in Table 1.

TABLE 2

| | Flexure Formed Geometry/Modeled DCF | | | | | |
| --- | --- | --- | --- | --- | --- | --- |
| Profile | 1st Bend Location (BL) | 1st Bend Angle (BA) (α24) | 2nd BL | 2nd BA (α36) | Resulting Pitch Angle (α16) | Modeled DCF |
| p3 | 0.19 | 9 | 0.235 | 0.00 | 0.98 | 0.34 |
| p7 | 0.19 | 9 | 0.235 | 0.50 | 1.47 | 0.34 |
| p8 | 0.19 | 9 | 0.235 | 0.75 | 1.72 | 0.34 |
| p4 | 0.19 | 9 | 0.235 | 1.00 | 2.00 | 0.34 |
| p9 | 0.19 | 9 | 0.235 | 1.50 | 2.49 | 0.34 |

*Bend location is measured from locus L3; Bend and Pitch angles are in degrees.

The invention, thus provides novel and improved methods of manufacturing disk drive suspensions and the flexures thereof, and an improved disk drive suspension and flexure in which dimple contact force is step-wise increased by successive deflections of the flexure frame in which the staged deflections of the frame outrigger struts provide longitudinally spaced shoulders that carry the tongue supported by the frame into closer proximity to the load beam and thus increase dimple contact force and improve performance of the suspension, e.g. increasing the dimple contact force by two times by modifying the suspension flexure. The foregoing objects are thus met.

I claim:

1. A method of manufacturing a disk drive suspension flexure, including carrying a flexure tongue in cantilevered relation on a flexure frame for dimple contact with a load beam, and doubly deflecting said frame to define first and second deflections at longitudinally spaced locations and in the same direction to twice increase the dimple contact force between said tongue and said load beam.

2. The method according to claim 1, including also deflecting said frame differentially in successive deflections so that successive deflections are smaller.

3. The method according to claim 1, including also varying the flexure tongue pitch angle by varying the second of said double deflections.

4. The method according to claim 1, in which said flexure extends in a flexure plane, and including also deflecting at a first location a first portion of said frame to a first angle to the flexure plane, and deflecting at a second location a portion of said frame first portion to a second, greater angle to said flexure plane to twice shift said tongue toward said load beam to twice increase said dimple contact force.

5. The method according to claim 4, including also deflecting said frame differentially in successive deflections so that successive deflections are smaller.

6. The method according to claim 5, including also varying a flexure tongue pitch angle by varying the second of said double deflections.

7. A method of operating a disk drive suspension flexure, including carrying a flexure tongue in cantilevered relation on a flexure frame in dimple contact with a load beam, and maintaining a double deflection in said frame to define first and second deflections at longitudinally spaced locations and in the same direction in dimple contact force between said tongue and said load beam twice increasing relation.

8. The method according to claim 7, including also maintaining a differential in deflection between said double deflections such that deflection relatively closer to the locus of dimple contact is smaller than deflection relatively farther from said locus.

9. A disk drive suspension flexure comprising a flexure frame carrying a flexure tongue in cantilevered relation for dimple contact with a load beam, and a double deflection in said flexure frame at longitudinally spaced locations to twice increase the dimple contact force between said tongue and said load beam.

10. The disk drive suspension flexure according to claim 9, in which said frame is differentially doubly deflected in relatively larger and relatively smaller deflections.

11. The disk drive suspension flexure according to claim 10, in which said flexure tongue has a pitch angle that varies with variations in the extent of the smaller of said frame deflections.

12. The disk drive suspension flexure according to claim 9, in which said flexure extends in a flexure plane and has a first frame portion, said first frame portion having a second frame portion, and said double deflection includes a first deflection at a first location in said frame first portion, said deflection being to a first angle to the flexure plane, and a second deflection at a second location in said second frame portion, said deflection being to a second, greater angle to said flexure plane, whereby said tongue is shifted toward said load beam in dimple contact force twice increasing relation.

13. The disk drive suspension flexure according to claim 12, in which said second deflection is less than said first deflection.

14. The disk drive suspension flexure according to claim 12, in which said flexure tongue has a pitch angle at least partially determined by said second reflection.

15. In combination: the disk drive suspension flexure according to claim 9 and a load beam.

16. A method of manufacturing a disk drive suspension flexure, said flexure comprising a base, a cross member, a pair of spaced, opposed outrigger struts extending from said base and supporting said cross member and a tongue, the method including carrying the tongue in cantilevered relation from said cross member and in dimple contact with said load beam, deflecting a first portion of each of said outrigger struts at a first locus to increase the force of said dimple contact, deflecting a second portion of each of said outrigger struts comprising said deflected first portion at a second locus to further increase said dimple contact force, and locating said first locus relatively farther from said cross member than said second locus.

17. The method according to claim 16, in which said tongue has a terminus, and including also locating said first locus in a transverse plane located between said base and said tongue terminus.

18. The method according to claim 16, including also locating said second locus in a transverse plane extending through said tongue.

19. The method according to claim 17, in which said transverse plane is a first transverse plane, and including also locating said second locus in a second transverse plane extending through said tongue and parallel with said first transverse plane.

20. The method according to claim 16, including also extending said flexure in a flexure plane, deflecting each said outrigger strut first portion to lie in a first portion plane at a first angle to said flexure plane, and deflecting said outrigger strut second portion to lie in a second portion plane at a second, greater angle to said flexure plane.

21. The method according to claim 20, including also maintaining said second portion plane at an angle to said first portion plane that is less than the angle of said first portion plane to said flexure plane.

22. The method according to claim 20, including also maintaining said first portion plane at an angle to said flexure plane that is at least three times greater than the angle of said second plane to said first portion plane.

23. A disk drive suspension flexure comprising a base, a cross member, a pair of spaced, opposed outrigger struts extending from said base and supporting said cross member and a tongue cantilevered from said cross member and in dimple contact with a load beam, each said outrigger strut having a first portion having at a first locus a first deflection arranged to increase the force of said dimple contact, each said outrigger strut having at a second locus a second deflection arranged to further increase said dimple contact force, each said outrigger strut being twice deflected in the same direction at longitudinally spaced locations to define said first and second deflections.

24. The disk drive suspension flexure according to claim 23, in which said tongue has a terminus, and each said strut has said first locus in a transverse plane located between said base and said tongue terminus.

25. The disk drive suspension flexure according to claim 23, in which each said strut has said second locus in a transverse plane extending through said tongue.

26. The disk drive suspension flexure according to claim 24, in which said transverse plane is a first transverse plane and each said strut has said first locus in said first transverse plane, and said second locus in a second transverse plane extending through said tongue.

27. The disk drive suspension flexure according to claim 23, in which said flexure extends in a flexure plane, and each said outrigger strut has a first portion first deflected to lie in a first portion plane at a first angle to said flexure plane, and a second portion separately deflected to lie in a second portion plane at a second, greater angle to said flexure plane.

28. The disk drive suspension flexure according to claim 27, in which said second portion plane lies at an angle to said first portion plane that is less than the angle of said first portion plane to said flexure plane.

29. The disk drive suspension flexure according to claim 27, in which said first portion plane lies at an angle to said flexure plane that is at least three times greater than the angle of said first portion plane to said flexure plane.

30. A disk drive suspension flexure extended in a flexure plane, said flexure comprising a frame having a base fixed to said load beam, a transverse cross member longitudinally spaced from said base, a pair of laterally spaced and opposed longitudinally extended outrigger struts extending from said base and supporting said cross member and a tongue cantilevered from said cross member toward said base, said tongue having a free terminus, said tongue and load beam having dimple contact in a dimple locus defined by said tongue and a load beam, said frame having a first transverse plane normal to said flexure plane and between said tongue terminus and said base, said frame having a second transverse plane normal to said flexure plane and longitudinally spaced from said first transverse plane, said second transverse plane intersecting said tongue, each said outrigger strut having a first portion having at a first locus within said first transverse plane a first relatively larger angle shoulder defined by a first strut deflection toward said load beam and arranged to increase the force of said dimple contact, each said outrigger strut having a second portion continuation of said first portion, said second portion having at a second locus within said second transverse plane a second relatively smaller angle shoulder defined by a second strut deflection of said already deflected strut first portion toward said load beam and arranged to further increase the force of said dimple contact, wherein said first angle shoulder disposes said strut first portion at an angle of about 1 to about 30 degrees to said flexure plane.

31. The disk drive suspension according to claim 30, in which said second angle shoulder deflection disposes said strut second portion at an angle between about 1 and about 30 degrees to said strut first portion.

32. In combination: the disk drive suspension flexure according to claim 23 and a load beam.

* * * * *

UNITED STATES PATENT AND TRADEMARK OFFICE
CERTIFICATE OF CORRECTION

PATENT NO.         : 7,667,930 B1                                    Page 1 of 1
APPLICATION NO. : 11/271389
DATED              : February 23, 2010
INVENTOR(S)        : Charles Wang It is certified that error appears in the above-identified patent and that said Letters Patent is hereby corrected as shown below:

In claim 14, column 9, line 8, delete "reflection" and insert --deflection--.

Signed and Sealed this

Eighteenth Day of May, 2010

David J. Kappos
*Director of the United States Patent and Trademark Office*